United States Patent [19]

Lodder et al.

[11] Patent Number: 4,634,844

[45] Date of Patent: Jan. 6, 1987

[54] ELECTROWELDABLE SOCKET AND A DEVICE OF MANUFACTURING SUCH A SOCKET

[75] Inventors: Bernhard Lodder; Hans Overeijnder, both of Hardenberg; Jan P. van Dongeren, Bergentheim, all of Netherlands

[73] Assignee: Wavin B.V., Zwolle, Netherlands

[21] Appl. No.: 711,637

[22] Filed: Mar. 14, 1985

[30] Foreign Application Priority Data

Mar. 14, 1984 [NL] Netherlands ..................... 8400816

[51] Int. Cl.$^4$ .......................... H05B 3/58; F16L 13/02
[52] U.S. Cl. ........................................ 219/544; 285/21
[58] Field of Search ................. 219/535, 544; 285/21; 425/542, 547

[56] References Cited

U.S. PATENT DOCUMENTS

| | | | |
|---|---|---|---|
| 2,253,627 | 8/1941 | Knowles | 425/547 X |
| 2,506,574 | 5/1950 | Boydstun | 219/535 |
| 3,061,503 | 10/1962 | Gould et al. | 285/21 X |
| 3,215,761 | 11/1965 | Gelpey | 425/542 X |
| 4,224,505 | 9/1980 | Sturm | 219/544 |
| 4,365,144 | 12/1982 | Reich et al. | 219/544 X |
| 4,530,520 | 7/1985 | Nyffeler et al. | 219/544 X |

*Primary Examiner*—Donald A. Griffin
*Attorney, Agent, or Firm*—Wilkinson, Mawhinney & Theibault

[57] ABSTRACT

An electroweldable socket comprising a conducting wire or gauze near the inner wall of the socket, the socket being manufactured by feeding conducting metal wire or gauze to a transverse extrusion head of an extruder and cutting the pipe extruded from the extruder to a socket length.

Conducting wire may be fed to the extrusion head after having been wound to a helical spiral, the helical spiral may also be formed in the extrusion head or supplied accommodated in an outer groove of a thin walled tube having a helically extending outer groove. The wire may also be supplied as a hose assembled from said wires.

Gauze is supplied in a pipe form obtained from a strip.

The wire may comprise sections of helical spirals of mutally different pitch.

Windings or groups of windings may be short-circuited.

The socket is provided with connections for connecting to an electrical source if a conducting wire is present.

A device for manufacturing the socket comprises an extruder with a transverse extrusion head and an orifice for supplying conducting wire or gauze to the extrusion head.

8 Claims, 9 Drawing Figures

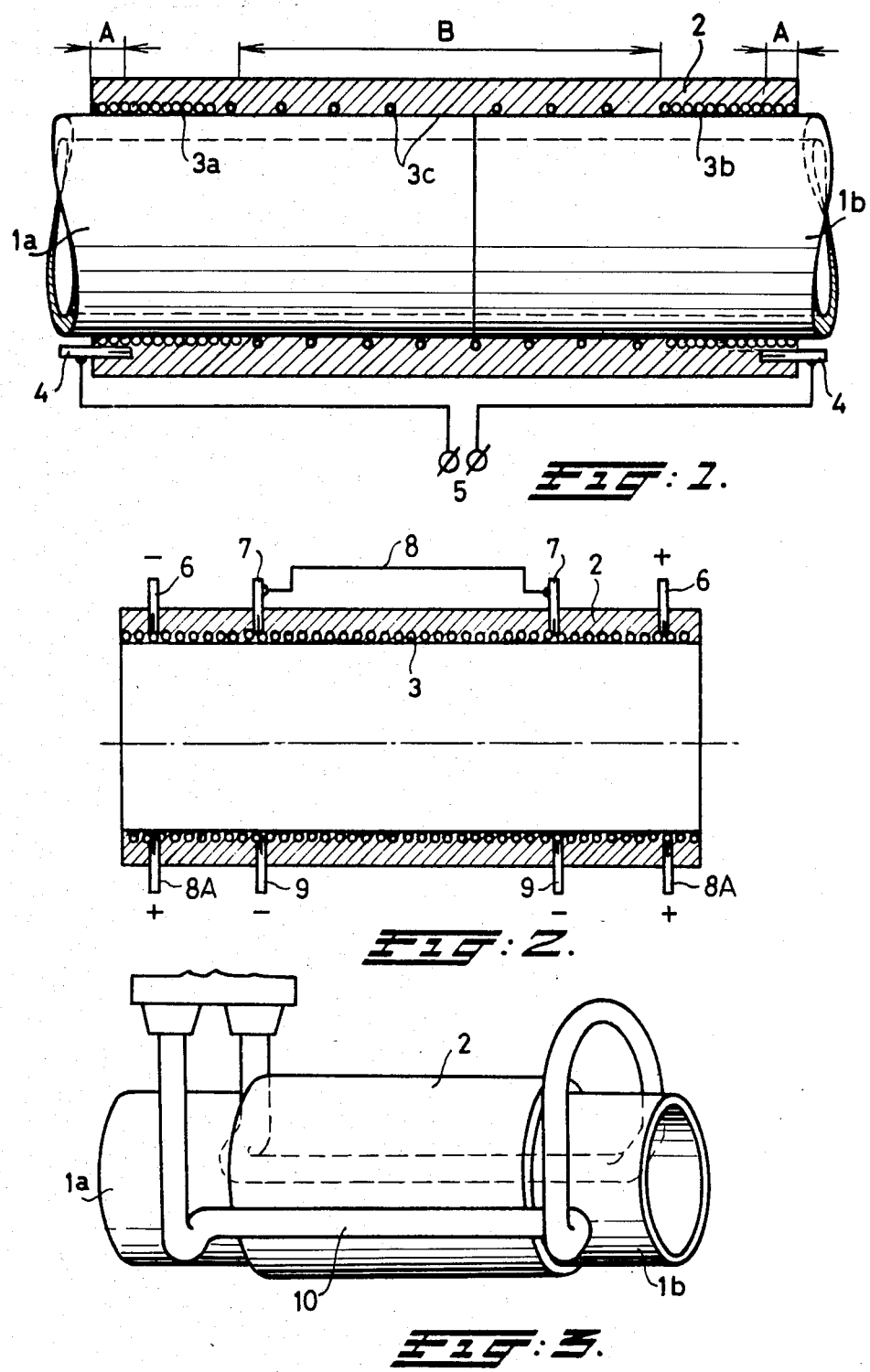

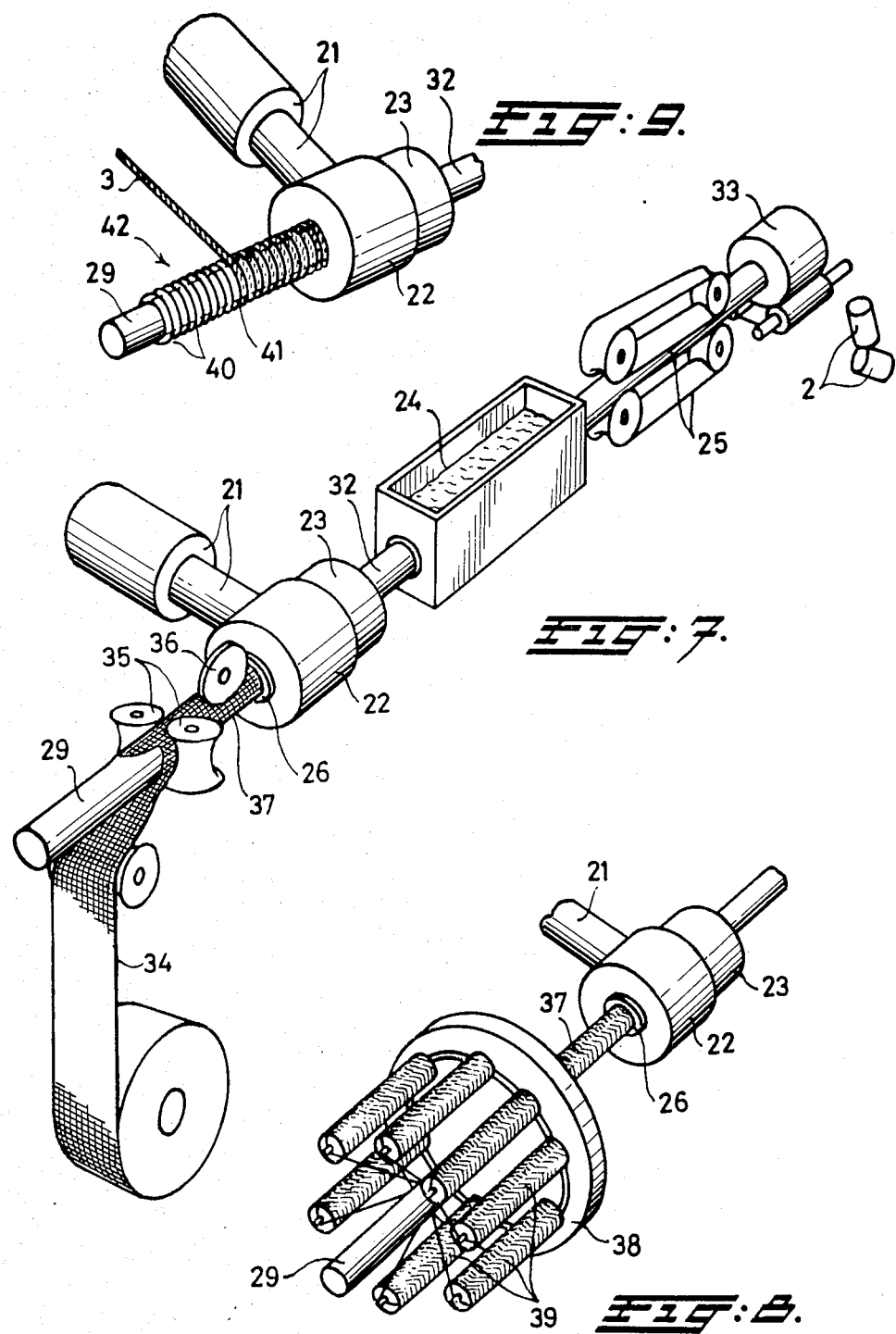

ELECTROWELDABLE SOCKET AND A DEVICE OF MANUFACTURING SUCH A SOCKET

BACKGROUND OF THE INVENTION

1. Field of the invention

The invention relates to an electroweldable socket of thermoplastic material manufactured by providing said socket internally, at least locally, with a lining of electrically conductive material near the inner wall of the socket. A socket as used herein means of course any pipe fitting which may be used for connecting such a pipe fitting with a pipe end by electroheat welding.

2. Description of the prior art

Two plastic pipes are frequently connected by sealingly placing a socket over the two pipe ends approaching each other. In the case of thermoplastic pipes it is known to fuse together the outer wall part of the pipe and the inner wall part of the socket by connecting an electrically conductive lining in the inner wall of the socket to an electrical source.

Use has been made in this case of a spiral, wound in a manner corresponding to a helical line, of an electrically conductive wire, which wire is for example pulled off the two ends of the socket in order to connect the latter with an electrical source, so that the wire heats the plastic in the vicinity of the spiral and fuses this plastic. Uptil now these sockets are manufactured in a complicated manner by on the one hand starting from an injection moulding process and on the other hand taking into account that the socket had to shrink so that the materials of socket and pipe are united in a satisfactory manner. These sockets accordingly are relatively expensive while the manufacturing time is relatively long.

SUMMARY OF THE INVENTION

It is the main object of the invention to provide electroweldable sockets of this type which can be manufactured continuously and in a very simple manner.

According to the invention this object is achieved by means of an electroweldable socket of thermoplastic material manufactured by providing said socket internally, at least locally, with a lining of electrically conductive material near the inner wall of the socket, wherein the electrically conductive material is passed in an extrusion head of an extruder for thermoplastics to form a lining which is embedded in the extruded material and which is drawn, together with the extruded material in the form of a pipe from the extrusion die, is cooled and thereafter cut to the desired socket length.

This permits a continuous production by means of a simple extrusion process.

It is possible here for the electrically conductive material to be wound up to give a helical spiral and to be fed to the extrusion head. It is also possible for the electrically conductive material to be fed to the extrusion head in the form of a wire and to be wound up to give a helical spiral in the extrusion head. The manufacture of connecting sockets makes it possible not only to manufacture sockets comprising an electrically conductive material placed between two connections of a voltage source, but also to obtain melting of the plastic material in a pipe connection by heating the electrically conductive material inductively. For this purpose the lining should be continuous from one side to the other side of the connecting socket, which is possible by moulding the socket according to the invention so that a strip of gauze of electrically conductive material is formed to give a pipe in front of the extrusion head, which pipe is introduced into the extrusion head, or so that the electrically conductive material is introduced into the extrusion head in the form of a hose assembled from one or more wires.

Since the procedures of supplying the electrically conductive material and of shortening the extruded pipe to give sockets are entirely in correspondence with the extrusion speed at which the pipe emerges from the extrusion head it is possible to manufacture a socket according to the invention in such a way that the wire of electrically conductive material is formed into sections of helical spirals of mutually different pitch. This makes it possible to manufacture connecting sockets of which the melting zones are restricted to very limited areas over the socket length. According to the invention it is possible to use blank wires of electrically conductive material or wire of electrically conductive material which are surrounded by a thermoplastic sheath. It is then also possible to wind one or more wires of electrically conductive material being surrounded by a thermoplastic sheath to give a helical spiral, wherein the thermoplastic materials of neighbouring windings in the peripheral direction of the spiral are fused together, locally or completely, before they are embedded in the plastic material of the connecting sleeves.

It is furthermore possible according to the invention for the windings or groups of windings of electrically conductive material to be mutually electrically short-circuited. This can be carried out before the lining is surrounded by plastic.

The invention also relates to a device for manufacturing an electroweldable socket comprising an extruder having a transverse extrusion head being provided, on the side opposite the extrusion die, with an inlet for electrically conductive material, said inlet for the electrically conductive material either comprising one or more passage orifices, each for a single wire, wherein each of these passage orifices cooperates with a device which is mounted in or at the extrusion head to form a helical spiral from each wire supplied or an annular orifice for the passage of a tube or hose of electrically conductive material.

Furthermore, a connecting socket according to the invention is preferably provided with means for connecting to an electrical circuit. These means can for example be pulled-off ends of wires of electrically conductive material or other connecting means can be attached in the lining, for example screws, nails or pins which come into contact with the lining of electrically conductive material and which project outwards from the wall of the socket or fitting. These connecting means can be conveniently attached by shooting pins into the wall of the socket or fitting. It is however, also possible to produce the connecting socket according to the invention in a manner such that it is provided with at least one electrically short-circuited lining of electrically conductive material which is adapted to be placed in a field of high-frequency alternating current for heating this lining inductively. The socket may consist of any thermoplastic materials but polyolefins such as polyethylene or polypropylene are preferred.

SURVEY OF THE DRAWINGS

FIG. 1 is a side view of two opposite pipe ends of thermoplastic material surrounded by a connecting socket manufactured according to the invention, in axial cross-section;

FIG. 2 is an axial cross-section through a connecting socket according to the invention having connecting means for an electrical current to be supplied to the lining of electrically conductive material;

FIG. 3 is a perspective view of a high-frequency alternating current coil accommodated around a socket comprising two pipe ends;

FIG. 4 is an axial cross-section of a method for the manufacture of a lining of electrically conductive material which is embedded in thermoplastic material, in which the thickness of the lining is exaggerated for reasons of clarity;

FIG. 5 is a perspective view of a transverse extrusion head comprising a feed device and, around the latter, bushes with a lining of electrically conductive material;

FIG. 6 is a rear view of a transverse extrusion head having a feed device for electrically conductive material in the form of a wire;

FIG. 7 is a diagrammatic view of an extrusion installation having a feed device for feeding a lining of electrically conductive material, which is formed from a strip of gauze, to the extrusion head;

FIG. 8 is a perspective view of a feed device for a lining of electrically conductive material in the form of a woven hose; and FIG. 9 is a part of a socket manufactured according to another embodiment.

DESCRIPTION OF THE DRAWINGS

In FIG. 1, to illustrate the invention, a connecting sleeve or socket 2 of thermoplastic material such as polyethylene is placed around two pipe ends 1a and 1b, the connecting socket being provided, by means of the method according to the invention, with linings 3a, 3b and 3c of electrically conductive material. This connecting socket 2 is manufactured by introducing the electrically conductive material into an extrusion head (FIGS. 6, 7 and 8) of an extruder for thermoplastics in order to form this lining embedded in the extruded material of the connecting sleeve 2, by drawing the lining, together with the extruded material, in the form of a pipe from the extrusion die (FIG. 7), cooling same and subsequently shortening it to the desired sleeve length, which will be described in more detail below. The linings 3a, 3c and 3b, as well as lining 3 in FIG. 2, each are a helical spiral of conductive material which is initially supplied to the extrusion head, or each are a wire which is wound up in the extrusion head to give a helical spiral, which is described below with reference to FIGS. 5 and 6. In order, to make on the two ends of the sleeve an electrical connection consisting for example of a pulled-off winding of the lining, preferably in the form of a pin 4 inserted into the sleeve, the lining can be connected to a voltage source 5 so that it is heated and the material surrounding the socket and the material of the pipe are melted and thereafter fused together, which guarantees a good sealed connection. Since the pin 4 short-circuits the outer windings of the lining cold zones will arise at the ends of the sleeve which are indicated by distance A. This is to prevent molten material from the pipe or from the socket from flowing out of the ends of the socket. Since the windings over the area B are far apart, consequently a cooler zone is produced here and the generated heat over this area is so low that the material does not melt completely in this area. By this means, the correct position of the pipe ends relative to each other is maintained during working in the field and no molten plastic will flow into the interior of the mutually opposite pipe ends. This is also possible when the windings of the lining are equally close over the entire length of the socket such as is shown in FIG. 2. By shooting in the pins 6 and the pins 7, such as indicated in the top half of FIG. 2, the cold zones can likewise be produced. If a voltage is applied to the pins 6, which voltage is indicated by + and − for the sake of clarity, the windings on the socket ends will not participate in the circuit. If the pins 7 are connected through, for example with the aid of a lead 8, the windings between the two pins 7 are shortcircuited so that here again a cold zone is produced. The same effect can be achieved by using pins 8a and pins 9, the pins 8a being connected for example to a positive pole and pins 9 to a negative pole of a current source. In FIG. 2, the pins are inserted into the sockets radially, but these pins can of course also be inserted tangentially or axially into the wall of the sleeve 2 until they come into contact with windings of the electrical conductor so as to produce an electrical connection.

High-frequency heating is also possible by placing a high-frequency induction coil 10 around the connecting sleeve. It is recommended here to construct a socket intended for this purpose in a manner such that a peripheral lining is always produced in each cross-sectional surface. This can be effected by using the method according to the invention, wherein a strip of gauze of electrically conductive material is formed into a pipe in front of the extrusion head, which pipe is introduced into the extrusion head, as will be described below with reference to FIG. 7. It is also possible here for the electrically conductive material to be introduced, in the form of a hose assembled from one or more wires, into the extrusion head, as will be illustrated below with reference to FIG. 8.

Figure 4:
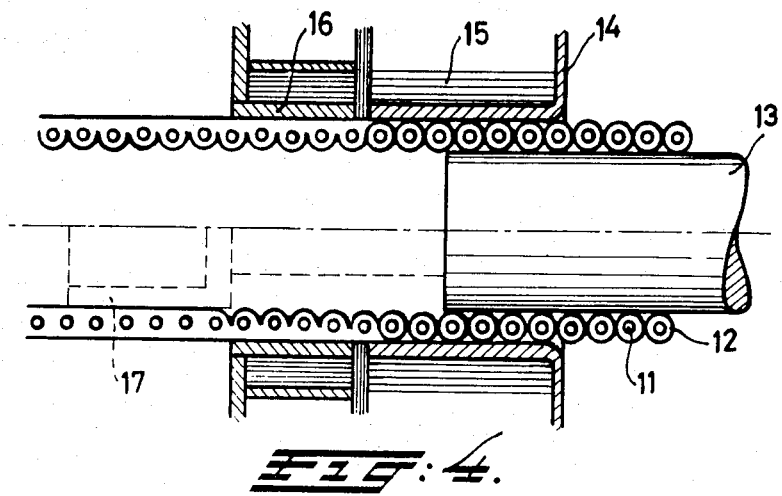

FIG. 4 shows a lining consisting of a wire 11 wound helically which is surrounded by a sheath 12 of thermoplastic material, as indicated by reference numeral 12. The thickness of the sheath 12 is exaggerated for the sake of clarity.

The wire 11 together with the sheath 12 is introduced into funnel 14 which is provided with a heating element 15. The funnel wall is thereby heated to a temperature which causes the sheath 12 to melt and the wire core containing the plastic sheath material molten around the periphery passes through a cooling zone 16. This produces an electrically conductive tube or pipe which can be fed to an extrusion head. It is also possible to fuse the sheath 12 to the inner edge by means of an internal heating and cooling element, as is indicated in the lower part of FIG. 4 by means of dotted lines 17. The electrical lining with the surrounding thermoplastic is thereby extruded in a reliable manner, while the thermoplastic is introduced not as a stream of liquid but as a sheath. In this manner it is possible, therefore, to obtain a method which consists in winding one or more wires of electrically conductive material, which are provided with a sheath 12 lining of thermoplastic, to give a helical spiral, wherein the thermoplastic material 12 of neighbouring windings in the peripheral direction of the spiral are fused together, locally or completely, before it is embedded in the plastic material of the connecting socket or pipe fitting. The manufacture of connecting sockets by means of the method according to the invention can be carried out continuously and also by using a device for carrying out the method, of which parts are shown in FIGS. 5-8. The device for carrying out the method comprises an extruder 21 having a transverse extrusion head 22, a calibrating head 23, a cooling device 24 in the form of a cooling bath and a draw bench which is generally indicated by reference numeral 25 (FIG. 7).

Figure 5:
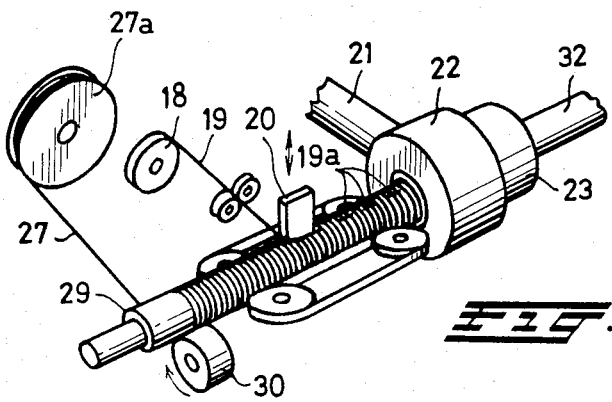
Figure 6:
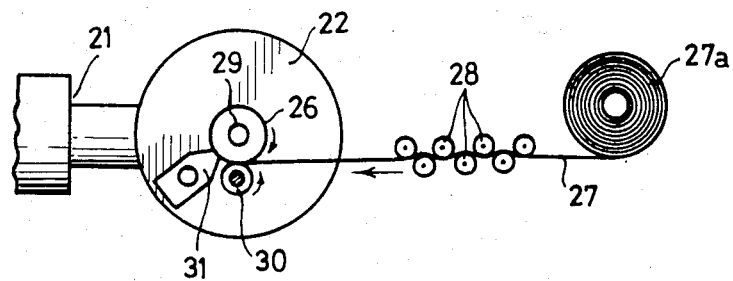

The device is characterised, according to the invention, in that the transverse extrusion head 22 possesses an inlet 26 for electrically conductive material on the side opposite the calibrating head. The inlet 26 for the electrically conductive marerial contains one or more passage orifices, each for a single wire 27, which are drawn from a reel 27a via drawing rollers 28. A device 29, in particular a winding core, which is mounted in or on the extrusion head cooperates with each passage orifice to form a helical spiral from each wire supplied. FIGS. 5 and 6 show only one wire but it is obvious that two or more wires can also be supplied, while successive windings are always formed from helical spirals lying next to one another. The core 29 can be driven by, and cooperate with, a draw-off roll 30 and a stripping edge 31. The and can be inserted in the extrusion head to such an extent, and the pressure roller 30 with the stripping edge 31 can be attached so close to the extrusion head, that the helical spiral itself is formed in the extrusion head. The inlet 26 is preferably formed as an annular orifice for the passage of a tube or hose of electrically conductive material. The electrically conductive material, embedded in a pipe 32 of extruded material, then arrives in the cooling bath 24, is kept under constant tension by the takeoff device 22 and is transported further to a shortening device 33. These shortening devices are generally known and consist of a saw or milling device which is displaced, during its operative period, at the rate of the extruded pipe, for example with the aid of a carriage 24 on a guide 25. The movement cycle of the shortening device 23 is such that the pipe is formed into connecting sleeves 2 of determined length. Since the cycle of the shortening device 23 is entirely adapted to the extrusion speed or discharge speed including shrinkage, the position of a pipe to be shortened can always be reliably determined. This makes it possible, likewise in a continuous manner, for the wire of electrically conductive material to be formed into sections of helical spirals of mutually different pitch, such as indicated in FIG. 1 by reference numerals 3a, 3b and 3c, wherein the pipe is separated to give a connecting sleeve 2 exactly between a section A and a section B. Only the winding device has to be adapted so as to form spirals having sections of mutually different pitch. In FIG. 7, a stationary core 29a is employed for the extrusion head 22 near the passage orifice 26 and the electrically conductive material is fed to this core in the form of a gauze 34. A gauze tube is fed into passage orifice 26 by means of driven pressure rollers 35 and 36 respectively. This can also be effected with the aid of a hose 37 which is woven from wire which is woven around the stationary core 29a by means of a spool mounted on a weaving plate 38. According to the invention, a connecting socket or pipe fitting 2 manufactured according to the invention is thus provided with a lining 3 of electrically conductive material near the inner wall of the socket or fitting and is provided with means 4, 6, 7, 8 and 9 for connecting to an electrical circuit. Furthermore, the connecting socket according to the invention can be provided with at least one peripheral lining 37 which is adapted to be placed in a field of high-frequency alternating current for inductively heating this lining (FIG. 3). As is shown in FIGS. 1, 2 and 3, the connecting socket is provided with a lining of electrically conductive material assembled from a helical spiral which is embedded in the plastic material of the connecting socket. FIG. 1 clearly shows that the helical spiral of electrically conductive material possesses parts 3a, 3b and 3c with mutually different winding pitch. FIGS. 1 and 2 moreover show that a number of windings of the helical spiral are each electrically short-circuited, the windings being short-circuited by means of electrical connecting means 4, 7 and 9 which project out of their socket or fitting.

This short-circuiting can also be carried out in the socket or fitting wall, as shown in FIG. 5. The wire 27 arriving from the reel 27a is again wound up to form a helical spiral, via the draw-off roll 30 and the winding core 29, and is fed over a stationary core to the extrusion head 22. During this transport the windings or groups of windings are each electrically short-circuited, i.e. before the lining is surrounded by plastic. For this purpose a wire 19 which arrives from a reel 18 and which consists of a readily meltable but electrically conductive material for example soldering tin, is placed via a bolt 20, on the windings at the required positons, as is indicated by reference numeral 19a.

This lining can also be employed for the inductive heating with this electrical short-circuit, whether it is continuous or not.

When a wire has been provided with a sheath 12 the windings can be electrically short-circuited after or during the removal, at this place, of the sheath of thermoplastic material. This can be effected by melting or cutting. Though any thermoplastic material may be used for forming the sealing socket or sleeve, polyolefins such as polyethylene and polypropylene are preferred.

FIG. 9 shows an extruder 21 comprising a transverse extrusion head 22 and a calibrating head 23 as also shown in FIG. 7.

The extruder is fed with a thin walled plastic inner pipe 42 being provided with a helically extending groove 40 on its outer side and a metal wire 3 is accommodated in the groove on the outer side of the thin walled pipe 42. The inner wall indicated by the dotted line 41 is a smooth cylindrical wall.

In the extruder thermoplastics supplied from transverse extrusion head 22 will fuse together with the inner pipe thereby providing a sealing socket with a conducting metal lining 3 as shown in FIG. 2.

The helically extending groove 40 may be preferably formed by rolling without changing the inner wall of said pipe 42.

What is claimed is:
1. The method of manufacturing an electroweldable socket of thermoplastic material wherein the socket is provided internally in at least a local area with a lining of electrically conductive material near the inner wall of the socket comprising the steps of
   (a) continuously passing an electrically conductive material into a transverse extrusion path of a source of thermoplastic material flowing from an extruder to form a conductive lining which is embedded in the extruded thermoplastic material,
   (b) continuously drawing the extruded thermoplastic material and the electrically conductive material together in the form of a pipe from an extrusion source,
   (c) thereafter cooling the thus extruded plastic pipe and electrically conductive material therein, and

(d) thereafter cutting the pipe to the desired socket length.

2. The method of claim 1 wherein the electrically conductive filament material is first wound to form a helical spiral and then fed into the thermoplastic pipe being extruded in the form of a wire which is wound to give a helical spiral of electrically conductive filament accommodated in a helically extending outer groove of thin walled inner pipe of thermoplastic material and the inner pipe is fused to the outer extruded thermoplastic pipe externally surrounding the electrically conductive material.

3. The method of claim 2 wherein the electrically conductive filament material is in the form of a strip of gauze of electrically conductive material fed in advance of an extrusion head so that a thermoplastic pipe emerges from an extruder having an electrically conductive inner lining.

4. The method of claim 3 wherein the electrically conductive filament material in the form of a hose assembled from one or more wires is introduced into the extrusion head of the extruder.

5. The method of claim 1 wherein the electrically conductive filament material is a wire formed to give sections of helical spirals of mutually different pitch.

6. The method of claim 1 wherein the electrically conductive material comprises at least one wire of electrically conductive material provided with a sheath of a thermoplastic material wound to give a helical spiral, while the thermoplastic materials from neighboring windings in the peripheral direction of the spiral are at least locally fused together before they are embedded in the thermoplastic material of the pipe.

7. The method of claim 6 wherein there are provided a plurality of electrically conductive materials are mutually electrically short circuited before they are surrounded with the thermoplastic externally extruded material.

8. The method of claim 7 further comprising the step of forming an electrical circuit connecting means for the electrical conductive material in the pipe.

* * * * *